(12) United States Patent
Maltz et al.

(10) Patent No.: US 8,681,387 B2
(45) Date of Patent: Mar. 25, 2014

(54) GUILLOCHE MARK GENERATION

(75) Inventors: Martin S. Maltz, Rochester, NY (US);
Zhigang Fan, Webster, NY (US);
Reiner Eschbach, Webster, NY (US);
Judith Stinehour, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 574 days.

(21) Appl. No.: 12/958,819

(22) Filed: Dec. 2, 2010

(65) Prior Publication Data
US 2012/0140252 A1    Jun. 7, 2012

(51) Int. Cl.
*H04N 1/32* (2006.01)

(52) U.S. Cl.
USPC ......... 358/3.28; 358/1.9; 358/1.15; 358/3.31; 382/100; 382/135; 345/582; 345/588; 715/201

(58) Field of Classification Search
None
See application file for complete search history.

(56) References Cited

U.S. PATENT DOCUMENTS

| | | | | |
|---|---|---|---|---|
| 5,235,435 A * | 8/1993 | Schiller | | 358/3.07 |
| 6,731,774 B1 * | 5/2004 | Hosaka et al. | | 382/100 |
| 6,750,985 B2 * | 6/2004 | Rhoads | | 358/3.28 |
| 7,130,087 B2 * | 10/2006 | Rhoads | | 358/3.28 |
| 7,352,492 B2 | 4/2008 | Maltz | | |
| 7,403,309 B2 * | 7/2008 | Moncrieff | | 358/3.12 |
| 7,580,153 B2 | 8/2009 | Eschbach et al. | | |
| 7,589,865 B2 | 9/2009 | Eschbach et al. | | |
| 7,697,170 B2 * | 4/2010 | Otake et al. | | 358/3.28 |
| 7,787,154 B2 * | 8/2010 | Fan et al. | | 358/3.28 |
| 7,855,800 B2 * | 12/2010 | Forlenza et al. | | 358/1.15 |
| 8,009,893 B2 * | 8/2011 | Rhoads et al. | | 382/135 |
| 8,139,270 B2 * | 3/2012 | Fan et al. | | 358/3.28 |
| 8,165,341 B2 * | 4/2012 | Rhoads | | 382/100 |
| 8,289,579 B2 * | 10/2012 | Simske et al. | | 358/3.28 |
| 8,355,178 B2 * | 1/2013 | Ishimoto | | 358/3.28 |
| 8,428,300 B2 * | 4/2013 | Pohjola et al. | | 382/100 |
| 2003/0026453 A1 * | 2/2003 | Sharma et al. | | 382/100 |
| 2004/0005076 A1 * | 1/2004 | Hosaka et al. | | 382/100 |
| 2004/0202846 A1 * | 10/2004 | Conk | | 428/195.1 |
| 2005/0018874 A1 * | 1/2005 | Rhoads | | 382/100 |
| 2008/0232892 A1 * | 9/2008 | Forlenza et al. | | 400/582 |
| 2008/0296885 A1 * | 12/2008 | Fan et al. | | 283/67 |
| 2008/0297852 A1 * | 12/2008 | Fan et al. | | 358/3.28 |
| 2009/0009782 A1 * | 1/2009 | Arakawa | | 358/1.9 |
| 2009/0058871 A1 * | 3/2009 | Mech et al. | | 345/582 |
| 2010/0165414 A1 * | 7/2010 | Kautto et al. | | 358/3.28 |

(Continued)

OTHER PUBLICATIONS

T. M. Holladay, "An Optimum Algorithm for Halftone Generation for Displays and Hard Copies", Proceedings of the SID, vol. 21/2, 1980, pp. 185-192.

(Continued)

*Primary Examiner* — King Poon
*Assistant Examiner* — Ted Barnes
(74) *Attorney, Agent, or Firm* — Fay Sharpe LLP (57) ABSTRACT

A method and system for creating guilloché base pattern with two-dimensional periodicity in a plurality of replicate patterns is shown wherein the creating can be assessed in real-time for pattern acceptability by a user. A base pattern is set on an imaging device in vector space relative to a set of predetermined pattern nodes. The base pattern is modulated via a user interface by adjusting positions of the pattern known for selectively controlling curve shapes of the pattern. A guilloché mark is illustrated by display on the imaging device of the adjusted base pattern and a compilation of associated replicate patterns for user assessment of the mark.

12 Claims, 7 Drawing Sheets

(56) References Cited

U.S. PATENT DOCUMENTS

2011/0141530 A1* 6/2011 Fan et al. .................. 358/3.28
2011/0214044 A1* 9/2011 Davis et al. ................. 715/201
2012/0229898 A1* 9/2012 Northey et al. ............. 359/530

OTHER PUBLICATIONS

C. Teh and R. Chin, "On the Detection of Dominant Points on Digital Curves", IEEE, PAM1, 11.7, pp. 859-872, 1989.

* cited by examiner

GUILLOCHE MARK GENERATION

CROSS REFERENCE TO RELATED PATENTS AND APPLICATIONS

Cross reference is made to the following pending published application: U.S. Patent Application Publication No. US-2008-0297852-A1, published Dec. 4, 2008, for "Variable Data Periodic Line Patterns for Composing a Font System".

Cross reference is also made in particular to the following U.S. patents: U.S. Ser. No. 11/313,397, filed Dec. 21, 2005, now U.S. Pat. No. 7,589,865, for "Variable Differential Gloss Font Image Data", U.S. Ser. No. 11/314,509, filed Dec. 21, 2005, now U.S. Pat. No. 7,580,153, for "Printed Visible Fonts with Attendant Background", and U.S. Ser. No. 11/756,390, filed May 31, 2007, now U.S. Pat. No. 7,787,154, for "Font Printing System Having Embedded Security Information Comprising Variable Data Periodic Line Patterns".

TECHNICAL FIELD

The presently disclosed embodiments are directed to period line pattern printing systems particularly applied as background to humanly perceptible alphanumerical, graphical or pictorial information.

BACKGROUND

Since print systems have been in existence, printers have sought methods for inhibiting counterfeiting and unauthorized copying of printed documents. Enhanced complexity in an engraved pattern of a press plate is one such method that most people are familiar with as a result of its everyday observation in currency bills. Bank checks, security documents, bonds and other financial documents are other examples of printed documents having complex background patterns to inhibit unauthorized reproduction. Identification documents, e.g. passports, social security cards and the like, are other examples. Credit cards not only have complex background patterns, but now also have embedded holographics to enhance verification and authentication of such a card.

Figure 5:
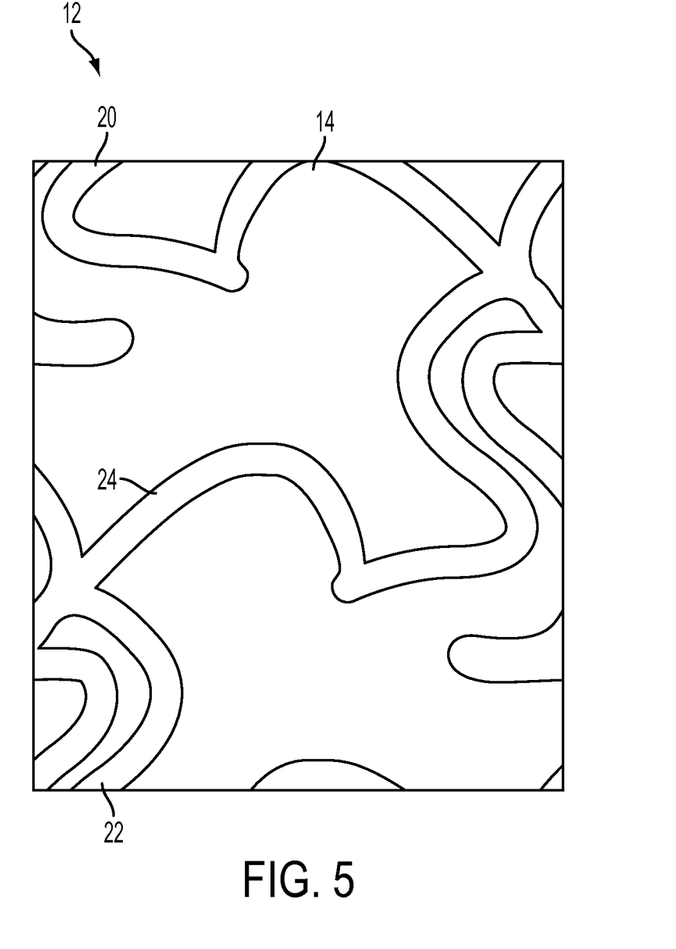
FIG. 5 is a base pattern.

As far as printed documents are concerned, a common complex background pattern is a guilloché line pattern, i.e., an ornamental pattern or border consisting of lines flowing in interlaced curves. FIG. 5 is a check pattern exemplifying a guilloché. The guilloché patterns are designed to be hard to reproduce and thus can serve as a security feature. Information can be embedded in the complexity of the patterns that can be used for many different purposes, which include authentication (e.g. comparing an embedded name information with a name on a check), process control (e.g. routing a check) and banking automation (e.g. recording the dollar amount of a check into a user's account).

There are two main issues in guilloché mark generation. First, a guilloché mark requires creation of a base pattern with two-dimensional (2D) periodicity. This is often difficult with existing graphical tools. Secondly, a pattern modulation to adjust a base pattern and associated replicate patterns is often performed on bitmaps, which sometimes produces visually unpleasing artifacts in the resulting adjusted line patterns, such as uneven curve thickness and abrupt transitions.

The creation of a guilloché mark starts with the 2D periodic pattern. By definition, the mark comprising a plurality of such patterns can be generated by repetition of a rectangular base pattern such as shown in FIG. 5, which is the enlarged base pattern comprising the guilloché mark of FIG. 6. The base pattern has to have a property of repeat symmetry. Specifically, there should be no artificial discontinuity if two base patterns are placed next to each other, whether in a horizontal or vertical direction.

Figure 6:
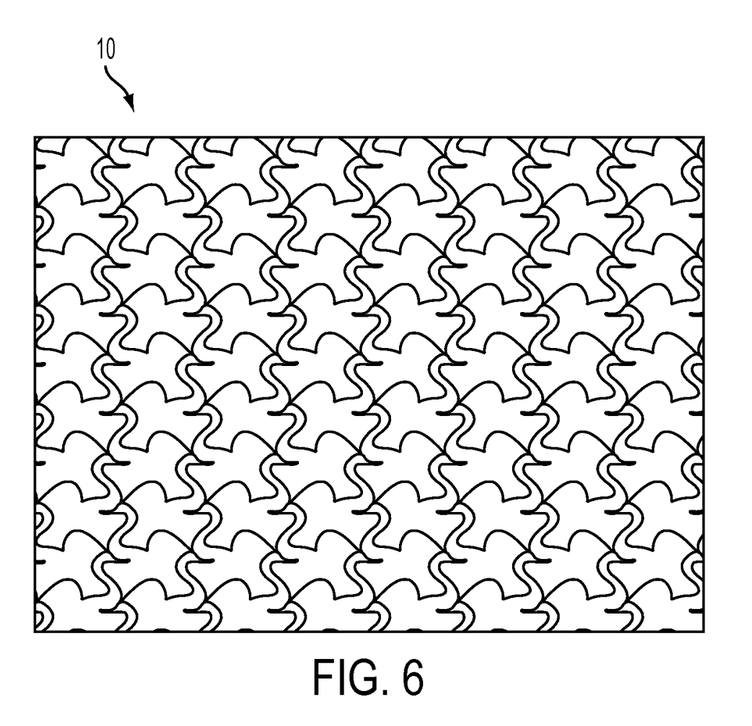
FIG. 6 is a compilation of the base pattern and replicate patterns.

Currently known graphical tools for generating such guilloché marks, and the base patterns thereof, make it difficult to design a pattern such as shown in FIG. 5, which when replicated, produces a pleasing space filling pattern without breaks such as FIG. 6. When drawing any line, the interaction of that line with all its periodic replicates has to be considered in the design. With known standard design tools, this is very difficult, since the periodic nature of the pattern is not explicit in such tools.

Once a base pattern is designed, a set of templates can be created such that each template resembles the base pattern in general, but is different from the base pattern in minute details. Specifically, in such known implementations, a grid is imposed on the bitmap of the base pattern. A template, same size as the basic pattern, is generated by locally shifting the base pattern as follows: (1) if the pixel is on an interior grid point (m, k), the pixel is shifted by two random numbers, [r_x(m,k), r_y(m,k)], in x and y directions, respectively; (2) if the pixel is on a boundary (non-interior) grid point, no shift is performed; (3) if the pixel is not on the grid, its shift is an interpolation of the shifts of its four nearest neighboring grid points. The template generated by the above procedure is a slightly distorted version of the basic pattern. By varying random numbers, N templates can be produced, where N is the number of different symbols to be embedded. The templates produced by such a procedure are generally acceptable in terms of image quality and detection rate. However, a careful examination reveals that visually unpleasant artifacts commonly do exist. Such artifacts can include uneven curve thickness and occasional sharp transitions in originally smooth curves. Applying random numbers with smaller amplitude may reduce the artifacts, but it will also compromise the detection accuracy.

There is a need for a base pattern generation tool that can preserve the desired continuity between adjacent replicate patterns when so shifted for creating such a plurality of N templates.

Another problem with the known systems is that the bitmap adjustment fails to provide a real-time, contemporaneous adjustment of a base pattern for designing a new guilloché mark in a manner that allows the designer to assess the overall mark quality, and to confirm the avoidance of any undesired artifacts. The ability to generate such a mark on-the-fly would avoid delays and inconsistencies resulting from bitmap shifting techniques for adjusting a base pattern.

There is thus a need for a system and method for creating guilloché marks that comprise a tool for generating a base pattern that can be replicated in the mark in a manner that avoids undesired artifacts, maintains line consistency, and which allows a mark designer to assess the results of the creative efforts in real-time.

SUMMARY

According to the aspects illustrated herein, there is provided an imaging design tool useful for designing guilloché marks comprising systems and methods for real-time pattern design modulation for selectively adjusting a base pattern design of a plurality of replicate patterns formed as a guilloché mark. The adjusting is assimilated in the mark while avoiding line pattern artifacts between the plurality of replicate patterns. An imaging device and a user interface therefore are provided for displaying the base pattern design and the replicate patterns to a user. A modulator marks selected control points in the base pattern design and in response to user designated adjustments of the base pattern design relative to the control points, contemporaneously adjusts the plurality of replicate patterns for assessment of the adjusted guilloché mark. The adjustment is effected relative to the plurality of replicate patterns to avoid line pattern artifacts of uneven curve thickness and abrupt transition.

Another disclosed feature of the subject embodiments comprises a method of creating a guilloché base pattern with 2D periodicity in a plurality of replicate patterns wherein the creation can be assessed in real-time for pattern acceptability by a user. The method comprises setting the base pattern in vector space relative to a set of predetermined pattern nodes. The base pattern is modulated by adjusting positions of the pattern nodes for selectively controlling curve shapes of the base pattern. The guilloché mark is a displayed on imaging device wherein the modulated base pattern and correspondingly modulated replicate patterns contemporaneously are displayed for user assessment of the mark.

DETAILED DESCRIPTION

As noted above, periodic line patterns, such as guilloché patterns, are commonly used in graphic design as a background for security documents such as checks and currency notes.

By definition, such a line pattern can be generated by a repetition or tessellation of a rectangular "base pattern", although other space tiling shapes and tile shifts/offsets are also possible and considered within the scope of this description. The base pattern has the property that there is no artificial discontinuity if two base patterns are placed next to each other, whether in a horizontal or vertical direction. FIG. 6 is an example of period pattern 10, and FIG. 5 shows a base pattern 12 (enlarged) for FIG. 6. FIG. 6 is thus a seamless, tilable association of the base pattern of FIG. 5. It is evident from FIG. 6 that the term "line pattern" used throughout this description is considered to be general, encompassing classical line patterns created in the guilloche process, as well as figurative patterns, icons and the like.

The base pattern is comprised of an exterior portion 14 of the pattern frame boundary wherein the line patterns have terminal ends 20 that will be matingly aligned with another terminal end 22 when a plurality of the base patterns 12 are congregated in a plurality of adjoining repetitions. The base pattern 12 also has an interior portion 24 spaced inwardly from the side walls of the base pattern, but the lines of the interior portion are also mostly seamlessly aligned with the lines of the exterior portion to similarly avoid readily apparent line discontinuities in the pattern arrangement.

Figure 2:
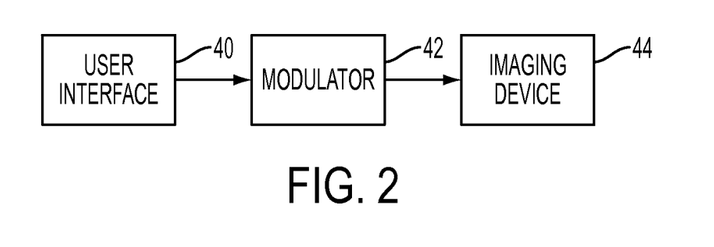
FIG. 2 is a block diagram showing system elements.
Figure 3:
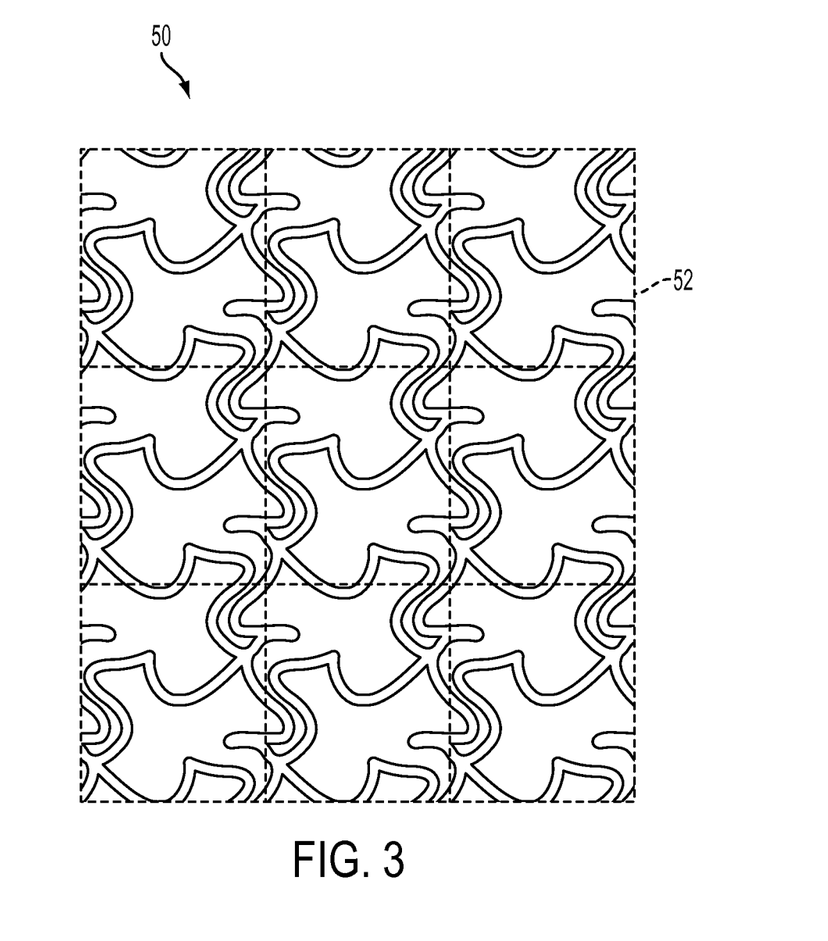
FIG. 3 is a representation of a drawing board with multiple tiles.
Figure 4:
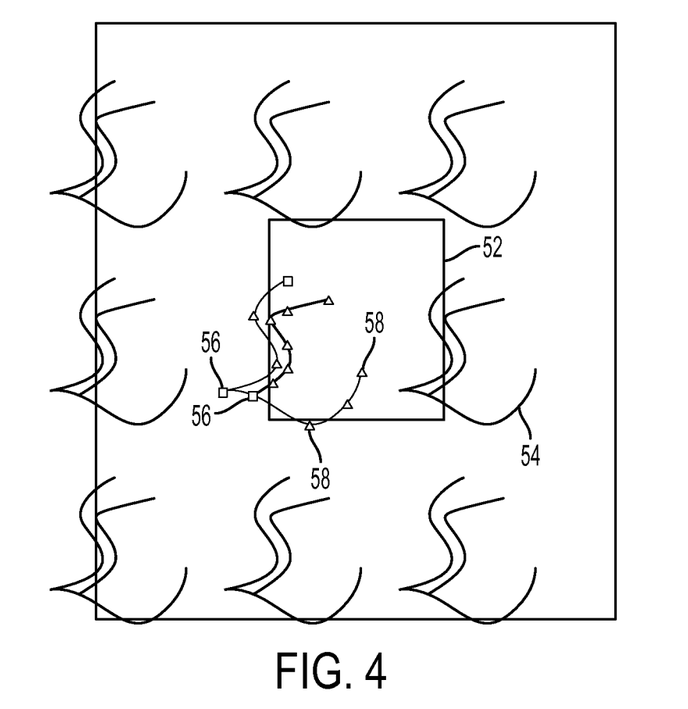
FIG. 4 is a drawing board showing control points disposed within and without tile boundaries.

The subject embodiments are more particularly directed to a guilloché mark creation tool for generating the subject line patterns including two parts: a user interface (UI) 40 (FIG. 2) that facilitates base pattern design, and a pattern modulator 42 that produces modulated line patterns with reduced visual artifacts. A principal component of the UI is an imaging device 44 comprising an interoperative multiple drawing board 50 (FIGS. 3 and 4). Each tile 52 represents one (2D) period of the graphic design. When content in one tile is edited, other tiles are accordingly modified automatically in real-time for contemporaneous assessment of any user adjustments to the base pattern and consequences on the replicate patterns performed in the multiple tile drawing board.

With reference to FIG. 4, the tile boundary 52 is shown and it can be seen that the curves 54 extend across the tile boundaries. Control points 56 identify curve places where curves are joined together. Control points 58 identify places where the operator can adjust position of the points and modulate the curve. Both points 56, 58 can be in or out of the boundary 52. It can thus be seen that the operator can draw (modulate) the curves in an intuitive way without worrying about the tile boundaries; and the subject tool takes care of the rest of the guilloché mark, i.e., replicate patterns.

Figure 7:
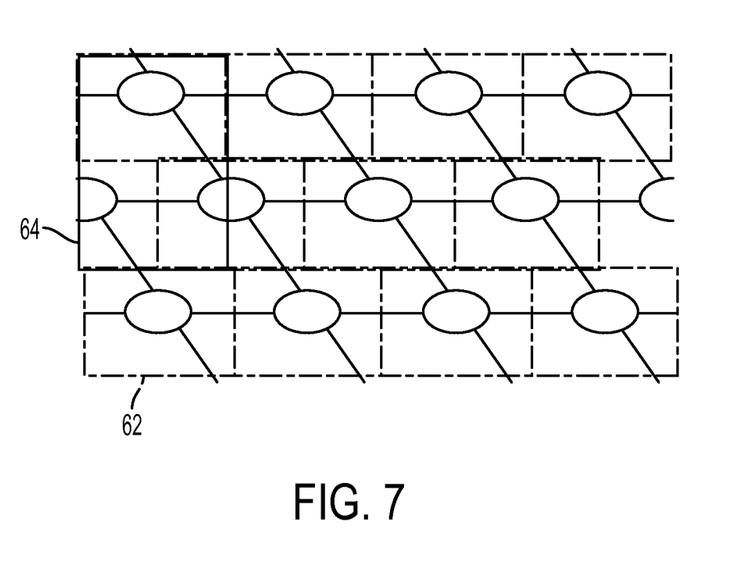
FIG. 7 is an example of a "Holladay" representation showing exemplar templates.

The tiles can be arranged in "Holladay" format (FIG. 7) that often more concisely and meaningfully represents the 2D structures. A Holladay block is well known for describing the geometric structure of halftone screens. More generally, the layout of any 2D period patterns can be specified by a Holladay representation with three parameters, height and width of the pattern block and a shift parameter giving the relative position between the neighboring rows of the blocks. FIG. 6 shows a simple example where the dash lines 62 specify the Holladay blocks and the solid parameter line 64 specifies a 2D period. Here, a Holladay block 62 is not only smaller than a 2D period (in this case, half the size) its content is also more meaningful in design (a 2D period in this case contains two identical patterns with a relative shift).

The drawing patterns are constructed using two kinds of curves, spline and hand drawn. For smooth curves, the user can specify selected control points 58 on a spline curve. In addition, the user can attach control points to a hand drawn curve. The curves can then be adjusted by moving the control points. Alternative terms for control points are "nodes" or "knots". Curves can also be attached to each other as specified points 56, so moving the point smoothly warps both curves. To store the state of the drawing so it can be recreated and edited further at a later time, data about each of the curves and the position of the control points can be written to a state file.

As noted above, the shape of the curves in the pattern is controlled by adjusting the position of control points attached to them. The pattern modulator only modulates the position of these control points. This retains line thickness and smoothness in modulation and ensures least visible artifacts.

With reference to FIG. 3, the subject UI contains a drawing board that is partitioned into multiple tiles 52. The content of each tile is identical, showing the current state of the design of the basic pattern. This multiple-tile arrangement enables the designer to visualize not only the basic pattern itself, but also the pattern when it repeats. The designer specifies the tile size and other parameters (such as the shift parameter in "Holladay" representation as will be described below) at the beginning of the pattern creation. This may also load existing patterns as the initial design. Users may then create new designs and/or edit the existing patterns. The repeat symmetry of the design is imposed by the system. Specifically, the content of each tile is ensured to be identical. The user may edit the design in any of the tiles, across the tile boundaries (e.g. if a line or a curve crosses the tile boundary), and the content of the tiles will be adjusted accordingly in an automatic fashion, and on-the-fly.

Figure 1:
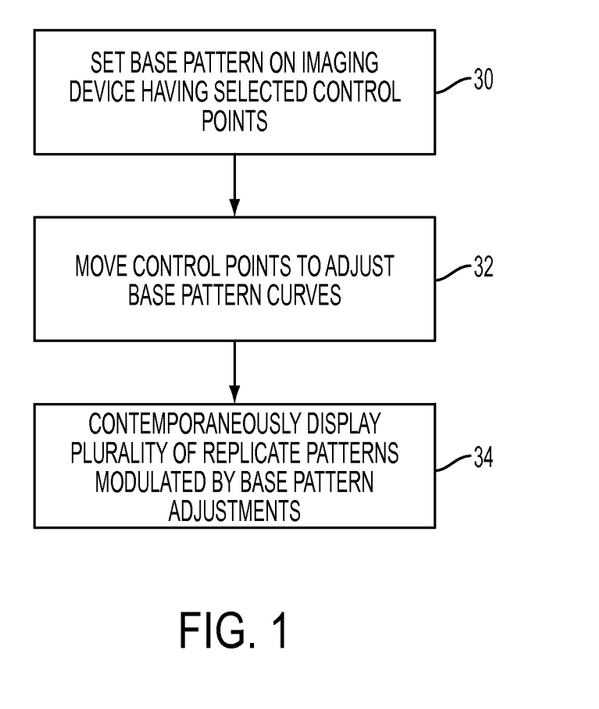
FIG. 1 is flowchart identifying steps in the practice of an embodiment method.

In the proposed method (FIG. 1), the templates are generated by modulating the control points in the state file description of the pattern. The base pattern is first set 30 on an imaging device having selected control points that may be moved or adjusted by a user. The user moves 32 the control points to adjust curves with the base pattern while the adjustment effects on replicate patterns is displayed contemporaneously to allow the user to assess the consequences of the adjustments. A vectorization process is performed if the base pattern is not originally designed in state file form. The vectorization process defines the subject curves as mathematical entities which can extend beyond the base pattern boundaries and therefor access replicate pattern boundaries to effect the desired line continuity. The nodes of the curves are then modulated as follows. A grid is imposed on the bitmap of the base pattern. For each template, two random numbers, $r\_x(m,k)$, $r\_y(m,k)$ are assigned to each interior grid point $(m, k)$, and zeros are assigned to the boundary grid points. Each node that specifies the curves are shifted by $[r\_x(m,k), r\_y(m,k)]$, if the node is on a grid point, and its shift is an interpolation of the shifts of its four nearest neighboring grid points, if the node is not on the grid. Again, different templates are generated with different random numbers. As the shift is only performed on the nodes, the thickness remains unchanged and the smoothness of the curves is ensured. The only change is the curve shape. The resulting templates are visually more pleasing.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of creating a guilloché base pattern with two-dimensional periodicity in a plurality of replicate patterns wherein the creating can be assessed in real-time for pattern acceptability by a user, comprising:
   setting the base pattern in vector space relative to a set of predetermined pattern nodes, the base pattern comprising a spline curve and a hand drawn curve, wherein the spline curve and the hand drawn curve are defined as mathematical entities extending continuously across replicate pattern boundaries;
   modulating the base pattern by adjusting positions of the pattern nodes for selectively controlling curve shapes of the base pattern; and
   displaying on an imaging device a guilloché mark comprised of the modulated base pattern and correspondingly modulated replicate patterns contemporaneously with the modulating for user assessment of the mark.

2. The method of claim 1 wherein the setting comprises specifying the nodes on a curve and then modulating comprises moving the nodes.

3. The method of claim 2 wherein the curves comprise a mathematical bitmap representation, and the moving of the nodes comprises a shift of a grid point bitmap representation resulting in only a change in curve shape.

4. The method of claim 1 wherein the displaying comprises displaying a multiple-tile arrangement of the base pattern and the replicate patterns in a Holladay block format for user visualization of base pattern adjusting and real-time consequence of the modulating between adjacent ones of the replicate patterns.

5. A real-time pattern design modulator for selectively adjusting a base pattern design of a plurality of replicate patterns formed as a guilloché mark wherein the adjusting is assimilated in the mark while avoiding line pattern artifacts between the plurality of the replicate patterns comprising:
   an imaging device;
   a user interface for displaying the base pattern design and the replicate patterns to a user on the imaging device, the base pattern comprising a spline curve and a hand drawn curve each including at least one of a plurality of control points;
   a modulator for marking selected control points attached to a curve at least a portion of which is located in the base pattern design, and in response to user designated adjustments of at least one of the selected control points of the base pattern design, contemporaneously adjusting the plurality of replicate patterns for assessment of the adjusted guilloché mark, and wherein the adjustment is effected relative to the plurality of replicate patterns to avoid line pattern artifacts of uneven curve thickness and abrupt transition, wherein the spline curve and hand drawn curve are defined as mathematical entities extending continuously across replicate pattern boundaries.

6. The modulator of claim 5 wherein the base pattern comprises a state file description.

7. The modulator of claim 6 wherein the base pattern comprises a bitmap representation defined in vector space rendered from the state file description.

8. The modulator of claim 7 wherein the bitmap representation comprises the selected control points and wherein the user designated adjustments modulate the control points.

9. A real-time pattern design modulator for selectively adjusting a base pattern design of a plurality of replicate patterns formed as a guilloché mark wherein the adjusting is assimilated in the mark while avoiding line pattern artifacts between the plurality of the replicate patterns comprising:
   an imaging device;
   a user interface for displaying the base pattern design, the base pattern design comprising a spline curve and a hand drawn curve, and the replicate patterns to a user on the imaging device;
   a modulator for marking selected control points in the base pattern design, and in response to user designated adjustments of at least one of the selected control points of the base pattern design, contemporaneously adjusting the plurality of replicate patterns for assessment of the adjusted guilloché mark, and wherein the adjustment is effected relative to the plurality of replicate patterns to avoid line pattern artifacts of uneven curve thickness and abrupt transition, wherein the spline curve and hand drawn curve are defined as mathematical entities extending continuously across replicate pattern boundaries.

10. The modulator of claim 9 wherein the base pattern comprises a state file description.

11. The modulator of claim 10 wherein the base pattern comprises a bitmap representation defined in vector space rendered from the state file description.

12. The modulator of claim 11 wherein the bitmap representation comprises the selected control points and wherein the user designated adjustments modulate the control points.

* * * * *